US010904476B1

(12) United States Patent
Siagian et al.

(10) Patent No.: US 10,904,476 B1
(45) Date of Patent: Jan. 26, 2021

(54) TECHNIQUES FOR UP-SAMPLING DIGITAL MEDIA CONTENT

(71) Applicant: Amazon Technologies, Inc., Seattle, WA (US)

(72) Inventors: Christian Garcia Siagian, Los Angeles, CA (US); Charles Effinger, Los Angeles, CA (US); David Niu, Los Angeles, CA (US); Yang Yu, Los Angeles, CA (US); Narayan Sundaram, Medina, WA (US); Arjun Cholkar, Bothell, WA (US); Ramakanth Mudumba, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/712,294

(22) Filed: Dec. 12, 2019

(51) Int. Cl.
*H04N 7/01* (2006.01)
*G06K 9/00* (2006.01)
*G06T 3/40* (2006.01)

(52) U.S. Cl.
CPC ....... *H04N 7/0117* (2013.01); *G06K 9/00288* (2013.01); *G06K 9/00718* (2013.01); *G06T 3/4046* (2013.01); *G06T 3/4053* (2013.01)

(58) Field of Classification Search
CPC ............ H04N 7/0117; G06K 9/00288; G06K 9/00718; G06T 3/4046; G06T 3/4053
See application file for complete search history.

(56) References Cited

U.S. PATENT DOCUMENTS

| 8,763,023 | B1 | 6/2014 | Goetz | |
|---|---|---|---|---|
| 10,182,271 | B1 | 1/2019 | Sanchez et al. | |
| 2007/0204211 | A1 | 8/2007 | Paxson | |
| 2008/0177781 | A1* | 7/2008 | Tan | G06F 16/48 |
| 2008/0292193 | A1* | 11/2008 | Bigioi | G03B 19/02 382/203 |
| 2012/0106806 | A1* | 5/2012 | Folta | G06K 9/00295 382/118 |

(Continued)

OTHER PUBLICATIONS

Jaiswal et al., "CapsuleGAN: Generative Adversarial Capsule Network," Available online at: https://arxiv.org/abs/1802.06167, Accessed from Internet at Oct. 2, 2018, 10 pages.

(Continued)

*Primary Examiner* — Michael E Teitelbaum
(74) *Attorney, Agent, or Firm* — Kilpatrick Townsend & Stockton LLP

(57) ABSTRACT

Techniques for automated up-sampling of media files are provided. In some examples, a title associated with a media file, a metadata file associated with the title, and the media file may be received. The media file may be partitioned into one or more scene files, each scene file including a plurality of frame images in a sequence. One or more up-sampled scene files may be generated, each corresponding to a scene file of the one or more scene files. An up-sampled media file may be generated by combining at least a subset of the one or more up-sampled scene files. Generating one or more up-sampled scene files may include identifying one or more characters in a frame image of the plurality of frame images, based at least in part on implementation of a facial recognition algorithm including deep learning features in a neural network.

17 Claims, 9 Drawing Sheets

(56) References Cited

U.S. PATENT DOCUMENTS

| | | | |
|---|---|---|---|
| 2012/0197930 A1* | 8/2012 | Newell | H04N 21/222 |
| | | | 707/769 |
| 2015/0082330 A1 | 3/2015 | Yun et al. | |
| 2016/0048723 A1 | 2/2016 | Jeong et al. | |
| 2016/0093022 A1* | 3/2016 | Lee | G06T 3/4053 |
| | | | 382/300 |
| 2016/0142794 A1 | 5/2016 | Yoo et al. | |
| 2019/0251363 A1 | 8/2019 | Kim | |
| 2019/0347478 A1* | 11/2019 | Sorci | G06K 9/627 |
| 2020/0125600 A1 | 4/2020 | Jo | |

OTHER PUBLICATIONS

Sabour et al., "Dynamic Routing Between Capsules," 31st Conference on Neural Information Processing Systems, Available online at: https://arxiv.org/abs/1710.09829, Accessed from Internet at Nov. 7, 2017, 11 pages.

U.S. Appl. No. 16/712,330, "Techniques for Validating Digital Media Content," filed Dec. 12, 2019, 40 pages.

\* cited by examiner

TECHNIQUES FOR UP-SAMPLING DIGITAL MEDIA CONTENT

CROSS-REFERENCE TO RELATED APPLICATIONS

This application is related to U.S. Non-Provisional application Ser. No. 16/712,330, filed Dec. 12, 2019, entitled "TECHNIQUES FOR VALIDATING DIGITAL MEDIA CONTENT," the disclosure of which is incorporated by reference herein in its entirety for all purposes.

BACKGROUND

Digital media libraries contain volumes of digital media content. Some digital media content may include audiovisual content, such as digital video or digitized films. Some digital media content may be displayed on a device having a pixel-resolution that exceeds the pixel-resolution at which the digital media content is encoded. Current media content may be available in multiple versions corresponding to more than one pixel-resolution standard, accompanied by metadata associated with the current media content. However, simple scaling of the digital media content to fit to the device creates resolution defects and continuity artifacts.

BRIEF DESCRIPTION OF THE DRAWINGS

Various embodiments in accordance with the present disclosure will be described with reference to the drawings, in which.

DETAILED DESCRIPTION

Figure 1:
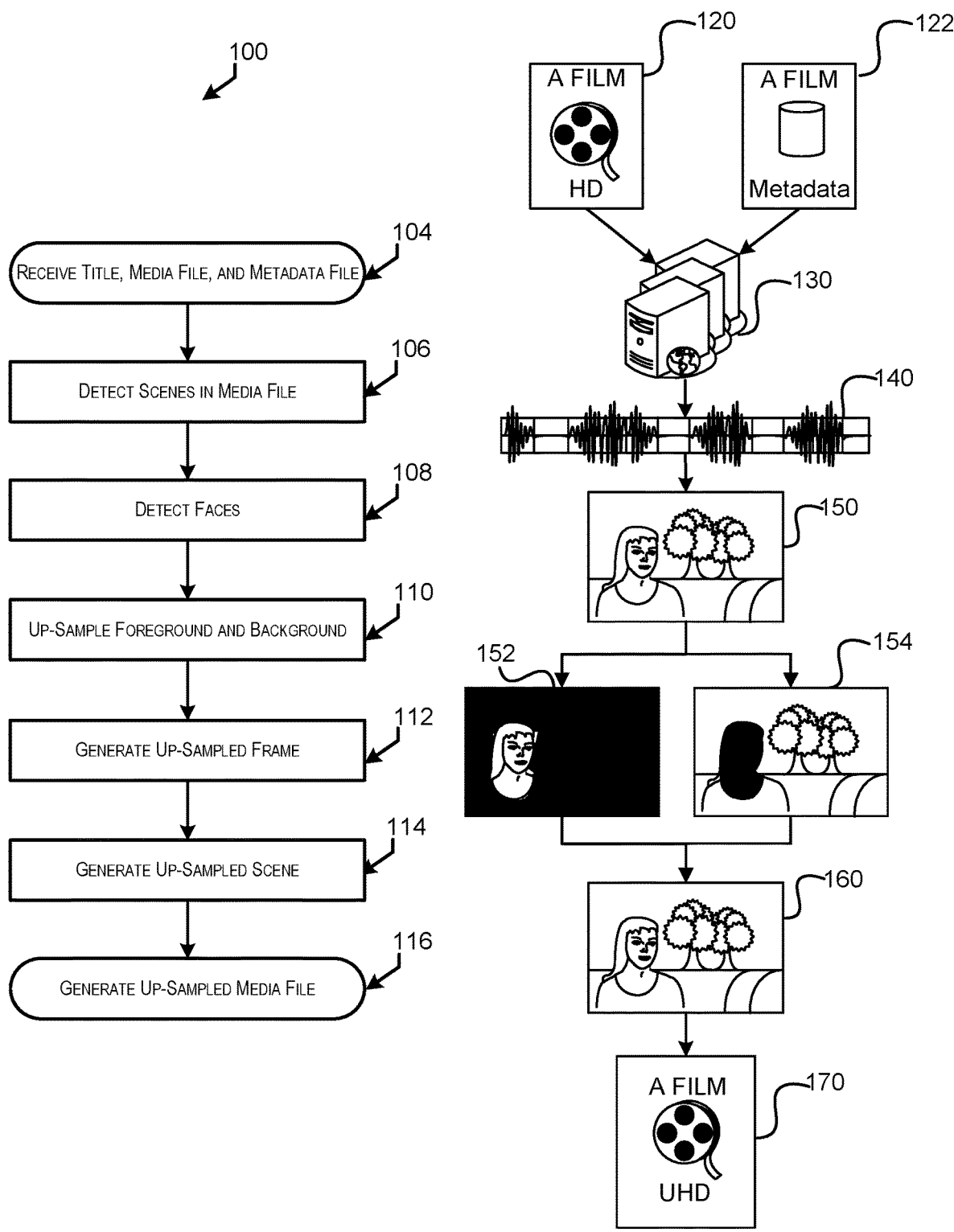
FIG. 1 is a block diagram illustrating an example technique for automated up-sampling of digital media content, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for automated up-sampling for augmenting a pixel-resolution of a media file according to one or more display resolution standards. When available, the highest available pixel-resolution makes a viewing experience more enjoyable, permitting display of the media file on a screen or surface with an image definition that meets or exceeds display resolution standards. However, the media file may correspond to an audiovisual recording of a motion picture that includes visual content encoded at a pixel-resolution corresponding to a resolution standard below the highest resolution that is currently available to consumers. In embodiments, a computer system (also referred to as a "service provider computer") implementing the automated up-sampling techniques described herein may identify and augment pixel-resolution in media files encoded at lower-resolution standards. In accordance with at least one embodiment, the service provider computer may be configured to automatically identify and up-sample a media file including but not limited to by converting a media file from Standard Definition ("SD") to High Definition ("HD"), from HD to Ultra-High Definition ("UHD"), and from HD to Ultra-High Definition-High Dynamic Range ("UHD-HDR"). In some embodiments, the service provider computer segments the media file into audio and video files, detects scene segments in the audio file and generates scene files from the video file according to the scene segments. In some embodiments, the scene files are up-sampled by detecting characters presented in the scene files at least in part by using facial recognition. In some embodiments, the service provider computer up-samples the scene files in parallel at least in part by using generative adversarial networks trained on metadata and other media files. Finally, the service provider computer may combine the up-sampled scene files preserving the order in which the scene segments were detected in the audio file.

As an illustrative example, a media file may be available in an database of motion picture files, where the media file contains a motion picture that was recorded before digital cinema technology existed. For instance, the motion picture may be a classic film, or a film produced during the twentieth century. Similarly, the media file may not be available in the database of motion picture files as versions encoded at contemporary standard pixel-resolutions.

Today, movies are recorded directly as digital media files. Before the development of digital film-making, however, recordings were made on many types of media. For instance, a film that was originally produced in 1974 would likely have been recorded at least in part by exposing coated plastic film to light. As digital technology developed, the film would likely have been digitized at the standards of the developing technology such as magnetic tape or digital-video-disc. With current streaming technology the film may be encoded as a digital media file stored in a cloud storage system. In today's system, the file may be encoded at any pixel-resolution that is suited for standard display technology. For example, television systems may have pixel-resolutions that meet the standards of 480-p, 720-p, 1080-p, 4k, 8k, etc. The digital media file may only be available at the highest resolution being 1080-p, which would not allow a user owning a 4k television to watch the film at the pixel-resolution for which his or her television was designed. The file could be up-sampled to increase its pixel-resolution to meet the display standard of the television.

To automatically up-sample the digital media file a computer system could proceed frame-by-frame from the beginning to the end of the file, which would be a slow process that would produce up-sampling artifacts including bright flashes and noticeably grainy images. Instead, the computer could first detect the scenes in the film at least in part by detecting scene transitions in the audio track of the media file. In most films and television programs, scene transitions may be accompanied by silence in the sound track. The computer system may then partition the video track of the media file into one or more scene files, corresponding to the scene transitions in the audio track, and thus the scenes in the film. In that way, the computer system may process more than one scene in parallel, which may reduce the time needed to up-sample the media file. In some instances, the computer system processes the scene files to detect and recognize the faces of the principal characters in the film. The computer system may rely at least in part on images of characters and cast members from the film that are available in metadata, such as a library of online movie information, to detect and recognize the principal characters appearing in the film. The computer system may then separately process the faces and backgrounds of each frame making up each scene file. The computer system may process the frames using machine learning models trained to produce up-sampled images. The machine learning models may include generative adversarial networks that are trained using pairs of media files at two different pixel-resolution standards with the inclusion of an attention layer to detect and track facial information based at least in part on the metadata. After up-sampling, the computer system may automatically combine the different parts of the frame at least in part by using a weighted blending method to produce an up-sampled frame. In turn, the computer system may assemble multiple up-sampled frames into an up-sampled scene file in a sequence as the frames were presented in the media file. Finally, the computer system may combine multiple up-sampled scene files in the order that the scenes appeared in the media file to generate an up-sampled version of the media file. The computer system may store the up-sampled version of the media file in an online database of digital media content for streaming to users.

FIG. 1 illustrates an example technique 100 for automated up-sampling of digital media content, in accordance with at least one embodiment. To generate an up-sampled version encoded of a media file, a service provider computer 130 may receive a title, a media file 120 at a pixel-resolution (e.g., HD), and a metadata file 122 associated with the title, as shown in operation 104. In some embodiments, as shown in operation 106, the media file may be separated into one or more scenes, including a number of frame images in a sequence of frame images 150. In some embodiments, the service provider computer 130 may detect and separate an audio file 140 from the media file 120, and detect and partition the audio file 140 into segments that correspond to the scenes in the media file 120. Each frame image 150 may be separated into a foreground region 152 and a background region 154 through face and object detection, shown in operation 108, enhanced by metadata including images of characters and actors from the film (e.g., human faces, animal faces, or any region of an object that can reasonably be used to identify the object). Following foreground detection and region separation, each region of the frame may be up-sampled, as shown in operation 110. In some embodiments, up-sampling is executed at least in part by one or more techniques implemented in a Generative Adversarial Network (hereinafter also referred to as "GAN"), trained using paired versions of other media files available in the database of motion picture files, as explained in reference to FIG. 5, below. The resulting up-sampled frame regions may then be combined into up-sampled frame images 160, shown in operation 112, in turn assembled into an up-sampled scene file and an up-sampled media file 170 encoding the motion picture at UHD resolution, shown in operations 114 and 116, respectively. Each of the preceding operations may be completed automatically by the service provider computer 130, as described in more detail, below.

Figure 2:
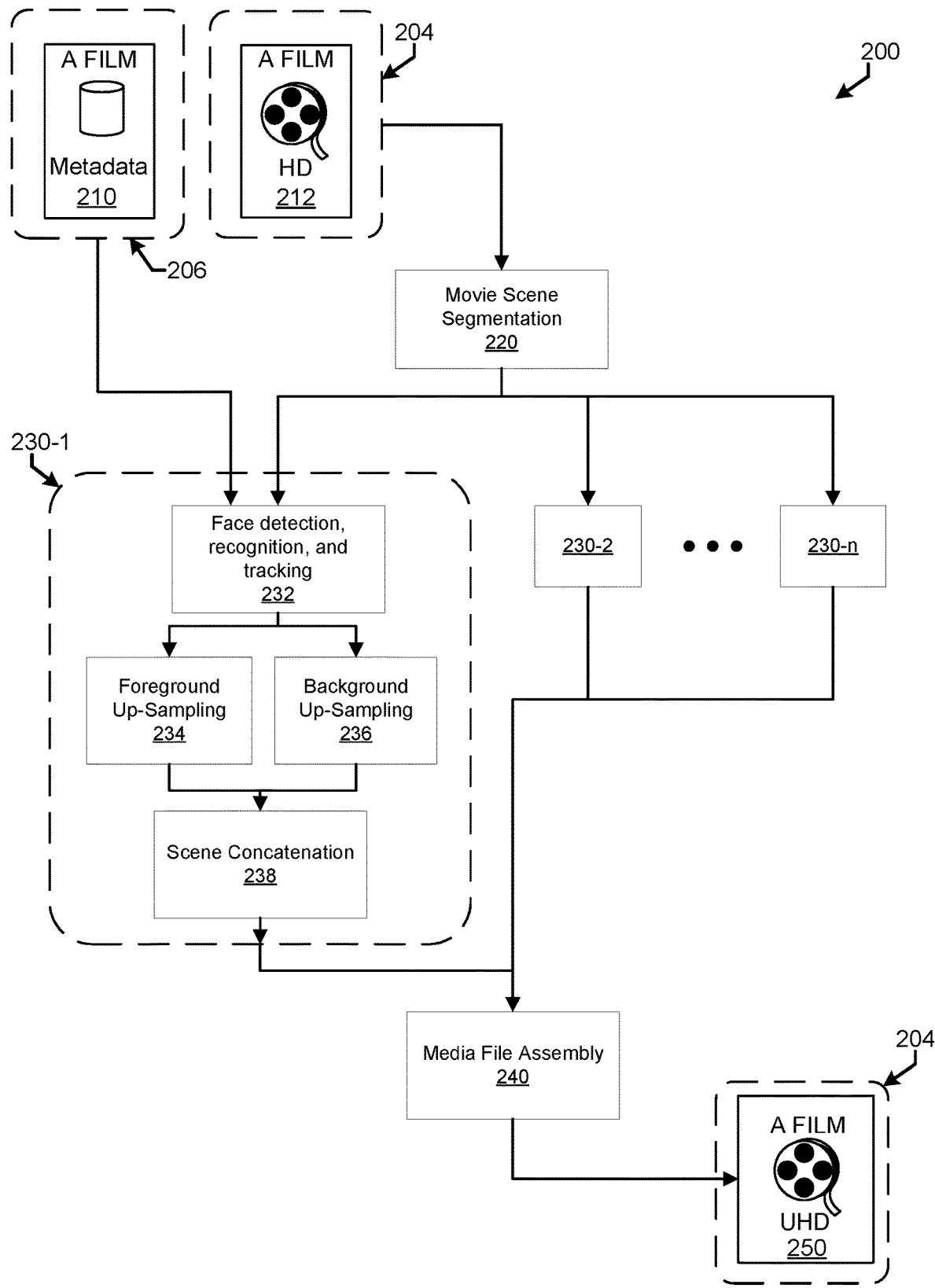
FIG. 2. is another block diagram illustrating another example technique for automated up-sampling of digital media content, in accordance with at least one embodiment.

FIG. 2. illustrates another example technique 200 for automated up-sampling of digital media content, in accordance with at least one embodiment. In some embodiments, a media file 212 is stored in a first database system 204. The media file 212 may be stored in the first database system 204, encoded at one or more pixel-resolution standards, but not at the highest available standard (e.g. at SD and HD, but not UHD or UHD-HDR). In some embodiments, a metadata file 210 is associated with the media file 212, and is stored in a second database system 206. The metadata file 210 may be stored in the first database system 204. In some embodiments, the media file 212 is received by a service provider computer (e.g. the service provider computer 130 of FIG. 1) and processed in a movie scene segmentation module 220. The movie scene segmentation module 220, as discussed in more detail in reference to FIG. 3, below, may partition the media file 212 into an audio file (e.g. the audio file 140 of FIG. 1) and a video file, and, via analysis of the audio file, segment the media file 212 into one or more scene files. In some embodiments, the movie scene segmentation module 220 segments the media file 212 into one or more scene files based at least in part on analyzing the video file directly. The movie scene segmentation module 220 may determine a scene transition at least in part detect one or more faces and background features and comparing changes in one or more of the faces over time. Alternatively, the movie scene segmentation module 220 may determine scene transitions at least in part by detecting dark segments in the video file corresponding to scene transitions (e.g. a fade-to-black type cut or a cut between scenes that features a dark screen for a given duration).

In some embodiments, a super-resolution up-sampling module 230-1 takes in a scene file and metadata from the metadata file 210, and processes the scene file to detect and recognize faces in the scene file in a face detection, recognition, and tracking module 232, as discussed in more detail in reference to FIG. 4, below. In some embodiments, face detection, recognition, and tracking module 232 includes a facial recognition engine, and limits tracking of detected faces to faces associated with characters identified in the metadata file 210. In this way, computational resources are conserved, thereby optimizing up-sampling efficiency. In some embodiments, after face detection and recognition, the super-resolution up-sampling module 230-1 partitions each frame image included in the scene file received from the movie scene segmentation module 220 into a foreground region and a background region. In some embodiments, the foreground region may be processed in a foreground module 234, while the background region may be processed in a background module 236, as discussed in more detail in reference to FIG. 5, below. The products of the respective up-sampling modules 234 and 236 may include super-resolution up-sampled images that are combined in a scene concatenation module 238, as discussed in more detail in reference to FIG. 5, below. In some embodiments, the scene files are processed in parallel by a plurality of super-resolution up-sampling modules 230-2-230-$n$ implemented in more than one processor of the service provider computer (e.g. the service provider computer 130 of FIG. 1), as discussed in more detail in reference to FIGS. 6-8, below. In some embodiments, the up-sampled scene files are combined in a media file assembly module 240 to produce an up-sampled media file 250, according to the sequence of scenes in the media file 212 as determined in the movie scene segmentation module 220. In some embodiments, media file assembly module 240 includes one or more blank transition scenes in the up-sampled media file 250 to achieve the total length of the media file 212. In some embodiments, the service provider computer (e.g. the service provider computer 130 of FIG. 1) stores the up-sampled media file 250 in the first database system 204, with the media file 212 to be accessible by users of the first database system 204.

Figure 3:
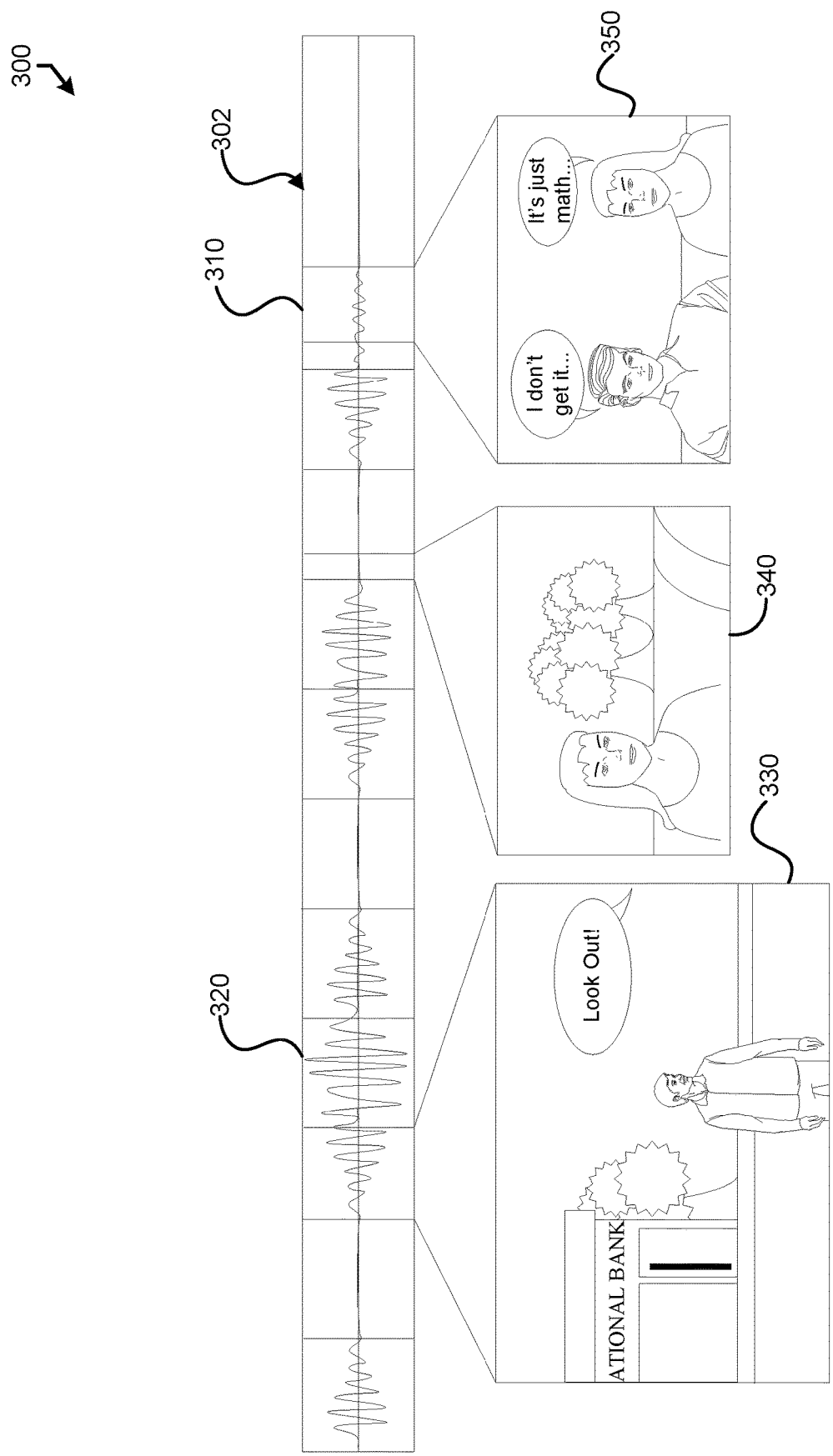
FIG. 3. is a diagram illustrating an example technique for movie scene segmentation, in accordance with at least one embodiment.

FIG. 3. is a diagram illustrating an example technique for movie scene segmentation 300, in accordance with at least one embodiment. In some embodiments, as described in reference to FIG. 2, the automated up-sampling technique (e.g. the technique 200 of FIG. 2) includes a technique for movie scene segmentation 300, which generates an audio file 302 from a media file (e.g. the media file 212 of FIG. 2). In some embodiments, movie scene segmentation technique 300 may partition the audio file 302 into scenes by classifying one or more quiet segments 310 of the audio file (e.g., low volume) and one or more loud segments 320 (e.g., high volume). A distinction between "quiet" and "loud" may be based at least in part on an intensity threshold value, above which a segment is classified as "loud." The distinction may also be based on clustering of segments based at least in part on a separation criterion. In some embodiments, the movie scene segmentation technique 300 may classify one or more quiet segments 310 or one or more loud segments 320 at least in part by implementing one or more spectrum analysis techniques including, but not limited to mel-frequency cepstrum, spectrum energy, and/or Fourier transform. The movie scene segmentation technique 300 may be implemented at least in part using a neural network, such that a separation criterion between quiet segments 310 and loud segments 320 is maximized.

The movie scene segmentation technique 300 may include an implementation of a Support Vector Machine (hereinafter referred to as "SVM"), stored in a computer readable memory as computer-executable instructions. In some embodiments, a SVM is a machine-learning model associated with one or more learning algorithms used for classification and regression analysis. The SVM may be implemented as a supervised learning model, trained based at least in part on a set of training data including pre-classified quiet segments and loud segments generated from one or more media files available in the database of media files (e.g. the first database system 204 of FIG. 2). In some embodiments, the SVM implements a two-dimensional linear classification without a pre-classified dataset of quiet segments and loud segments (e.g., being implemented as an unsupervised learning model), wherein the SVM detects clusters of segments and maps the segments to two or more groups (e.g. by the support-vector clustering algorithm).

In some embodiments, the movie scene segmentation technique 300 smoothes the one or more quiet segments 310 across a smoothing window corresponding to the length of a typical scene transition (e.g., in a range of one to ten minutes in duration), which may depend on characteristics of the media file associated with the audio file 302, such as genre, platform, content type, filmmaker and the like. For instance, in critically-acclaimed drama films, average scene duration is typically prolonged relative to that of fast-paced action films. In another instance, an individual filmmaker may be associated with longer than average scene durations.

In some embodiments, the movie segmentation technique may define the smoothing window at least in part based on information provided in a metadata file associated with the media file (e.g. the metadata file 210 of FIG. 2).

In some embodiments, the service provider computer obtains clustered quiet segments 310 having a length above the period of silence in a typical conversation, which may indicate a scene transition in the associated media file. In some embodiments, the media file may be partitioned into 20-60 loud segments 320 having durations in the range of minutes in length (e.g., between one and thirty minutes), in accordance with the clustered quiet segments 310. For each segment, the service provider computer may partition the media file into corresponding scene files associated with the scene transitions in the audio file 302. For example, scene files may depict one or more action scenes 330, one or more environmental or ambience scenes 340, or one or more dialogue scenes 350.

Figure 4:
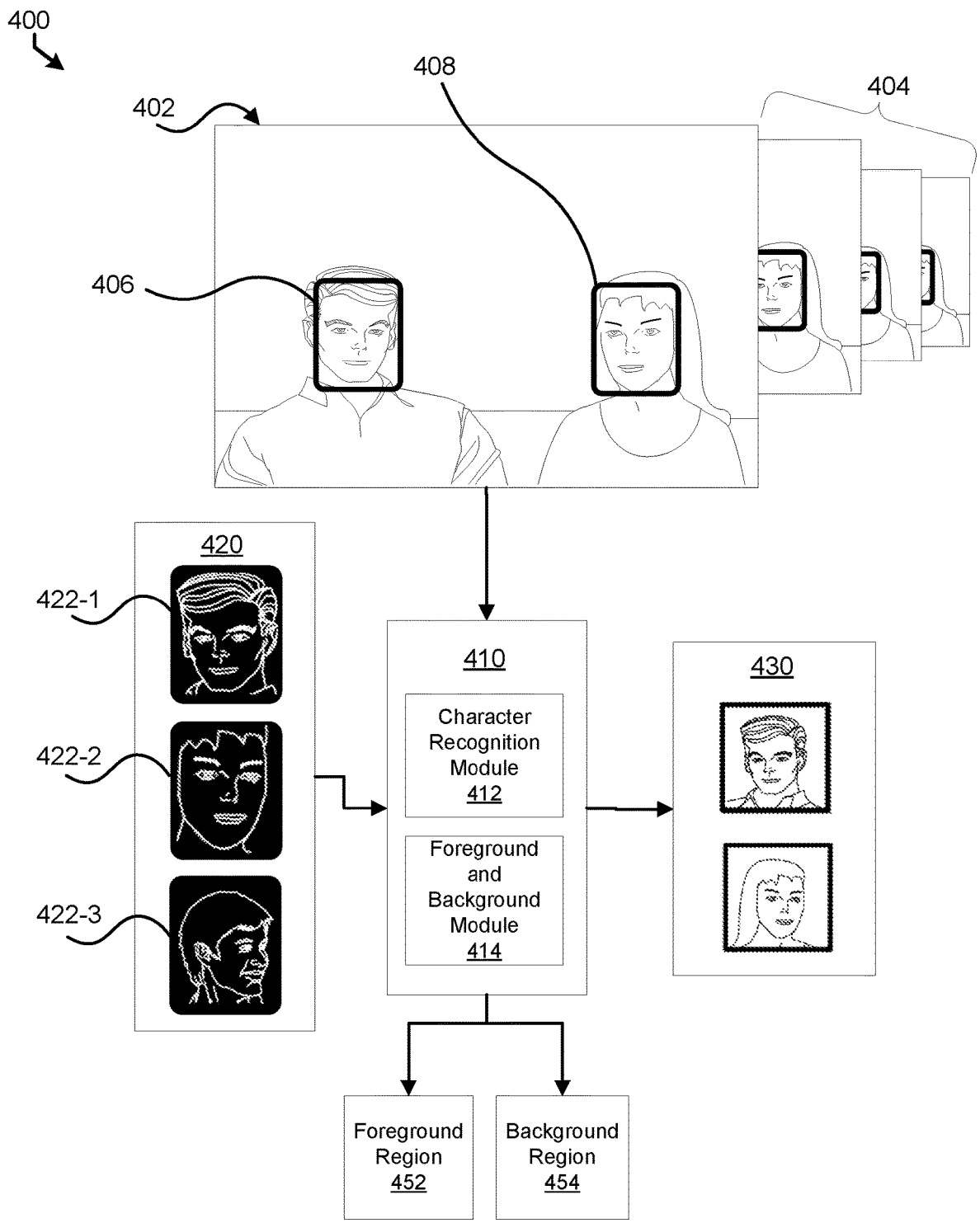
FIG. 4 is a diagram illustrating an example technique for facial detection, recognition, and tracking techniques, in accordance with at least one embodiment.

FIG. 4 is a diagram illustrating an example technique for facial detection, recognition, and tracking 400, in accordance with at least one embodiment. In some embodiments, the service provider computer processes a scene file 402 (e.g. the dialogue scene file 350 of FIG. 3), in a facial detection, recognition and tracking module 410. The scene file 402 may include one or more frame images in a sequence 404, originally recorded at a frame rate (e.g. 24 frames-per-second or 60 frames-per-second). For example, a scene file 402 associated with a three-minute long dialogue may include as many as 4,320-10,800 frame images in the sequence 404. In some embodiments, the facial detection, recognition and tracking module 410 samples the scene file 402 prior to facial detection by processing a limited number of frame images, according to a sampling rate, thereby reducing the effect of the frame rate on the computational demands of the facial detection, recognition and tracking module 410. For example, the sampling rate may be defined at one frame image per second, thereby setting the number of frame images processed in the facial detection, recognition and tracking module 410, regardless of the frame rate. In some embodiments, the sampling rate may be variable, based at least in part on one or more factors, including but not limited to a measure of the dynamics in the media file (e.g., a scene with many cuts between two or more camera angles may require a dynamic sampling rate to avoid omitting characters), a measure of the audio file (e.g., the service provider computer may detect many characters talking in rapid succession based on an audio file and may determine to sample at a rate correlated at least in part with the change in the number of characters speaking), and a measure of the average length of the scene file (e.g., a shorter-than-average scene file may require a higher sampling rate).

In some embodiments, the facial detection, recognition and tracking module 410 detects one or more faces in one or more frame images sampled from the scene file 402. The faces may be associated with a first facial region 406 and a second facial region 408. In some embodiments, one cast member is depicted in the scene file 402 (e.g. the one or more action scenes 330 and one or more environmental or ambience scenes 340 of FIG. 3). In some embodiments, more than two cast members are depicted in the scene file 402 (not shown in FIGS. 3-4). Alternatively, the facial region 406 may be detected in a crowd of faces (e.g. in a dialogue scene set in a crowded location including, but not limited to, a sporting venue or a restaurant). In some embodiments, the facial detection, recognition and tracking module 410 applies a detection threshold value based at least in part on the size of the face in the frame. In some embodiments, the facial detection, recognition and tracking module 410 may ignore a facial region where the relative size of the facial region is smaller than the detection threshold value. As described in reference to FIG. 2, the detection may be limited to faces visible in a minimum number of frame images, analogous to a duration of time in the scene file. For example, the facial detection, recognition and tracking module 410 may limit detection to facial regions detected in at least 30 frames, depending on the sampling rate. In some embodiments, the facial detection is achieved by techniques including, but not limited to, Eigen-face methods, line edge mapping methods, and histogram of oriented gradients methods. In some embodiments, facial detection includes non-human faces, including but not limited to non-human animal faces and anthropomorphized objects.

In some embodiments, the facial detection, recognition and tracking module 410 includes a character recognition module 412. In some embodiments, the character recognition module 412 processes the results of face detection to determine if any faces detected in the scene file 402 are associated with one or more cast members in a metadata file 420 associated with the scene file 402. In some embodiments, the metadata file 420 includes a plurality of image files 422-1-422-3 associated with the characters appearing in a media file associated with the metadata file 420 (e.g. the media file 212 of FIG. 2) as discussed in reference to FIGS. 1-2. In some embodiments, the character recognition module 412 matches the first facial region 406 with a first image file 422-1 of the plurality of image files, thereby recognizing the first facial region 406 as a cast member appearing in the scene file 402. The character recognition module 412 may define a tracking list 430 of cast members recognized in the scene file 402, such that the service provider computer (e.g. the service provider computer 130 of FIG. 1) implements an attention layer, as discussed in reference to FIG. 5, below. In some embodiments, the character recognition module 412 determines characters present in a scene file at least in part by analyzing the audio file (e.g. the audio file 302 of FIG. 3) to detect audio signatures linked to characters appearing in the media metadata file.

In some embodiments the character recognition module 412 includes an implementation of a facial recognition algorithm, stored as computer executable instructions in a computer-readable storage medium, as discussed in reference to FIGS. 7-8, below. In some embodiments, the character recognition module 412 implements a local binary pattern histogram ("LBPH") algorithm to detect faces in forward or half-profile. In some embodiments, the LBPH algorithm compares features in the second facial region 402 to features in the plurality of image files 422-1-422-3 to determine a match, by applying a match criterion (e.g. 128-dimensional face recognition applying a Euclidean distance criterion of 0.6 to discern a match between the plurality of images in the metadata file 420 and frame images sampled from the scene file 402). In some embodiments, the character recognition module 412 is trained using the plurality of image files contained in the metadata file 420 (e.g., by supervised learning implemented in a neural network). In some embodiments, the character recognition module 412 is trained using one or more facial recognition datasets collected from classified images of faces including, but not limited to, a database of media metadata (e.g. the database 210 of FIG. 2), and Labeled Faces in the Wild.

In some embodiments, the character recognition module 410 defines at least one region in the frame images making up the scene file 402. Based at least in part on the detection of one or more facial regions (e.g., the first facial region 406 and the second facial region 408) a foreground and background module 414 may generate a foreground region 452 and a background region 454. In some embodiments, the foreground region 452 contains one or more facial regions associated with the tracking list 430. In some embodiments, the background region 454 contains the portion of the frame image not including the foreground region 452. In some embodiments, the background region 454 contains the entire frame image, while the foreground region 452 is produced by cropping the one or more facial regions from the frame image.

Figure 5:
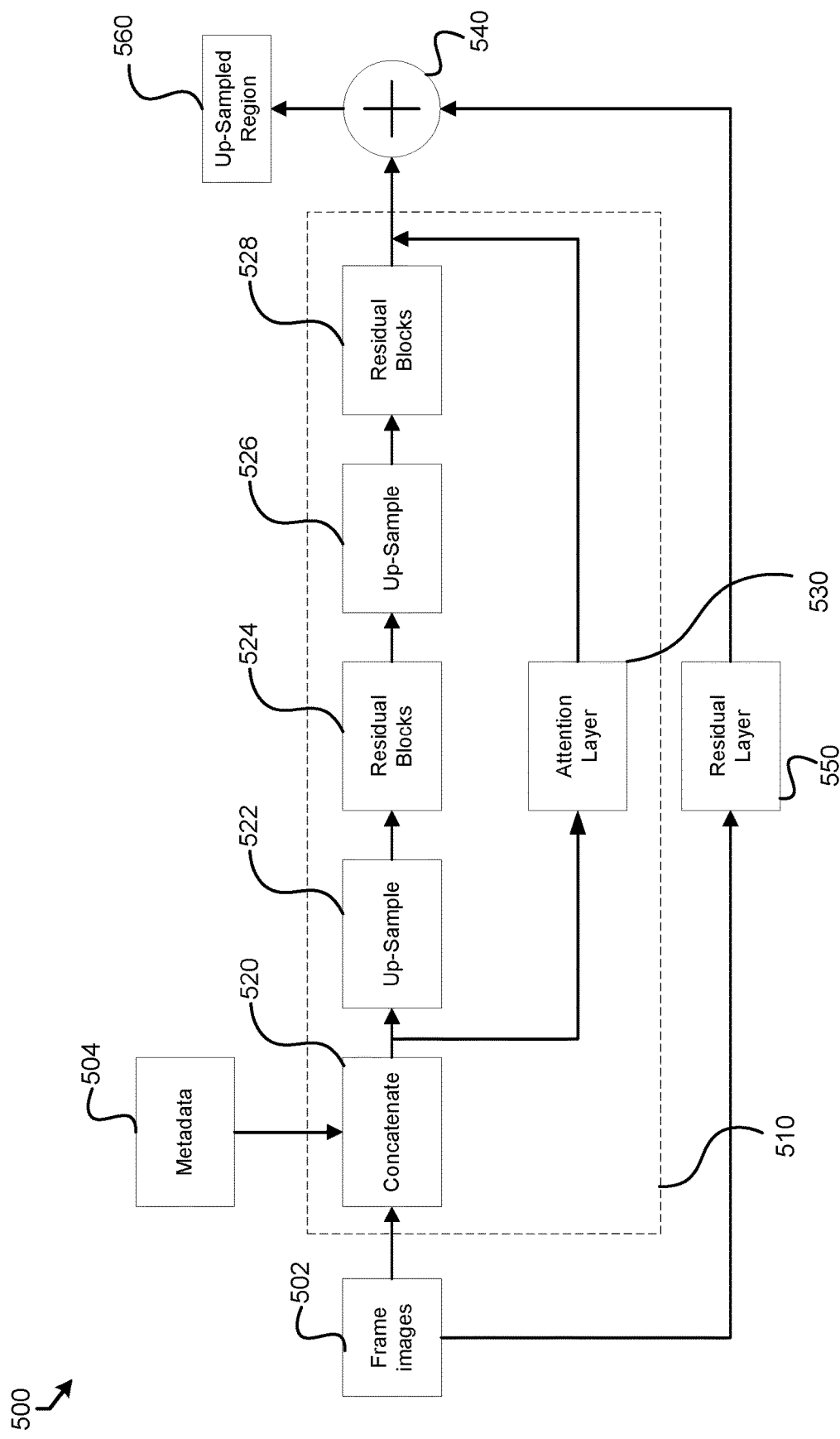
FIG. 5. is block diagram illustrating an example technique for automated up-sampling, in accordance with at least one embodiment.

FIG. 5. is block diagram illustrating an example technique for automated up-sampling 500, in accordance with at least one embodiment. In some embodiments, the service provider computer implements an adversarial model including competing generator and discriminator sub-systems. In some embodiments, the service provider computer implements the adversarial model at least in part by using a convolutional neural network. In some embodiments, the service provider computer uses other base sub-systems, including but not limited to capsule networks. In some embodiments, a scene file (e.g., the scene file 402 of FIG. 4) includes one or more frame images 502, and the service provider computer implements the automated up-sampling technique on a frame image. As discussed in reference to FIG. 4, the service provider computer may divide each frame into a foreground region and a background region, using a segmentation system that accounts for faces. To minimize the appearance of resolution artifacts that may result from resolution up-sampling, the service provider computer may implement a spatio-temporal GAN 510, which applies a machine-learning algorithm to up-sample each frame in two spatial dimensions and in time, constituting the spatio-temporal GAN 510. In some embodiments, the service provider computer implements a temporal continuity protocol by processing each frame image 502 in a scene file with the spatio-temporal GAN 510 provided with multiple frame images 502 preceding and following a central frame image of the frame images 502 (also referred to as a "continuity window") in the sequence of frames (e.g. the sequence 404 of FIG. 4). For example, the spatio-temporal GAN 510 may process a frame image of the frame images 502 for up-sampling in temporal context using a continuity window of three frames preceding it and three frames following it, for a total of seven frames. In some embodiments, the continuity window has a total number of frames equal to 3, 5, 7, 9, 11, and larger odd numbers.

In some embodiments the frame images 502 are processed by concatenating 520, a first up-sampling layer 522, and a second up-sampling layer 526. In some embodiments, the spatio-temporal GAN 510 processes one or more foreground regions (e.g. the foreground region 452 of FIG. 4) using face-respecting up-sampling, conditioned on facial features in metadata 504. In some embodiments, the service provider computer implementing the automated up-sampling technique 500 receives a metadata file 504 associated with a media file (e.g. the media file 212 of FIG. 2). The metadata file 504 may include a tracking list of images associated with characters and cast members appearing in a motion picture recorded in the media file (e.g. the tracking list 430 of FIG. 4). This may include, but is not limited to, the face of the actor in cinematic makeup and in frames taken from the motion picture itself. Concatenating 520 may include processes by the automated up-sampling technique 500 that concatenate condition vectors, including but not limited to vectorial representations of metadata 504 such as the facial features (e.g. metadata 420 of FIG. 4), to vectorial representations of the frame images 502 making up the continuity window, by methods such as conditional GAN (CGAN), fully conditional GAN (FCGAN), and the like.

In some embodiments, the spatio-temporal GAN includes one or more residual blocks 524 and 528, including one or more residual layers, implemented to improve the efficiency and effectiveness of the spatio-temporal GAN 510 by addressing the vanishing gradient problem. In some embodiments, the residual blocks 524 and 528 each include a number of residual layers ranging from 1-10, or more.

In some embodiments, the service provider computer implementing the automated up-sampling technique 500 includes a spatial-temporal attention layer 530 in the spatio-temporal GAN 510 to capture long-rage dependencies among one or more spatio-temporal neighborhoods. In some embodiments, a spatial-temporal attention layer 530 may group pertinent local and distant features over dimensions including, but not limited to, space, time, and feature space to improve up-sampling by the spatio-temporal GAN 510. For instance, the service provider computer may implement the spatio-temporal GAN 510 including a spatial-temporal attention layer 530 to track one or more faces or sub-regions within one or more faces in a foreground region of a frame, at least in part through employing a continuity window, such that the service provider computer minimizes continuity artifacts introduced during up-sampling of the frame images 502. In some embodiments, the output of the spatio-temporal GAN 510 is combined 540 with a residual layer 550, to generate an up-sampled region image 560.

In some embodiments, the spatio-temporal GAN 510 is trained using joint training of a generator and a discriminator, where the generator is an implementation of a multi-layer neural network in computer executable instructions stored in a computer readable storage medium. In some embodiments, the spatio-temporal GAN 510 is trained from paired images at two different pixel resolutions, wherein the spatio-temporal GAN 510 generates up-sampled regions 560 by memorizing and reproducing patterns adopted from training sets (e.g. a plurality of media files available at multiple pixel-resolutions in a database of media files). In some embodiments, the discriminator is similarly an implementation of a neural network, conditioned using a dataset of paired images at two different pixel-resolutions, corresponding to the resulting up-sample transition of the automated up-sampling technique 500 (e.g., SD-to-HD, HD-to-UHD, UHD-to-UHD-HDR, and the like). In some embodiments, the spatio-temporal 1 GAN 510 is trained to minimize a loss function calculated by comparison of up-sampled regions 560 to corresponding regions in images natively encoded at the up-sampled pixel resolution. As an illustrative example, a media file (e.g. the media file 214 of FIG. 2) that is available in both HD and UHD pixel-resolution versions may be used to train the spatio-temporal GAN 510, by providing the UHD versions to the discriminator to train it, for example by supervised learning conditioned on facial feature information, to differentiate between an image containing up-sampled foreground regions from an image containing native-resolution foreground regions at the up-sampled pixel resolution. In some embodiments, the spatio-temporal GAN 510 is trained to generate up-sampled regions such that the discriminator is as likely as not, within a confidence interval, to accept the reconstructed up-sampled image output of the spatio-temporal GAN 510 as a native-resolution image. In some embodiments, the generator training loss function includes determining the mean squared error with respect to elements including, but not limited to, the ground truth higher resolution image, the standard adversarial loss, the generator feature space loss, and the discriminator feature space loss. In some embodiments, the discriminator takes in two sets of images, corresponding to a continuity window of frame images at an original-resolution and the associated up-sampled resolution to calculate a loss function for the discriminator. In some embodiments, the loss function for the discriminator is the standard adversarial term (e.g. the 0-1 loss function used in logistic regression, the log-loss function, the hinge-loss function, and the like).

As described in reference to FIG. 2, the automated up-sampling technique (e.g. the automated up-sampling technique 200 of FIG. 2) may implement separate spatio-temporal GANs 510 for the background region and the foreground region of a frame image. In some embodiments, the background region is up-sampled in a spatio-temporal GAN, which is structured as shown in FIG. 5, save that the metadata 504 is excluded, and the spatio-temporal GAN is trained on background regions to optimize a rejection criterion generated by a discriminator.

The processes and systems described herein may be an improvement on conventional up-sampling methods for augmenting pixel-resolution in media files. For example, conventional methods for up-sampling media files include manually identifying characters in a media file, and up-sampling frame-wise from start-to-end of a media file, rather than scene-wise. As many different media files can exist that require up-sampling, the manual identification and serial processing can be a time consuming and computationally expensive process that still results in errors. Further, up-sampling an entire frame, without face region detection and attention tracking generates artifacts that greatly diminish the quality of the up-sampled media-file. As media file databases increase in size, bottlenecks may occur in the manual identification and up-sampling processes. However, the methods and systems described herein utilize an identification and up-sampling process that can more efficiently and automatically up-sample media files.

Figure 6:
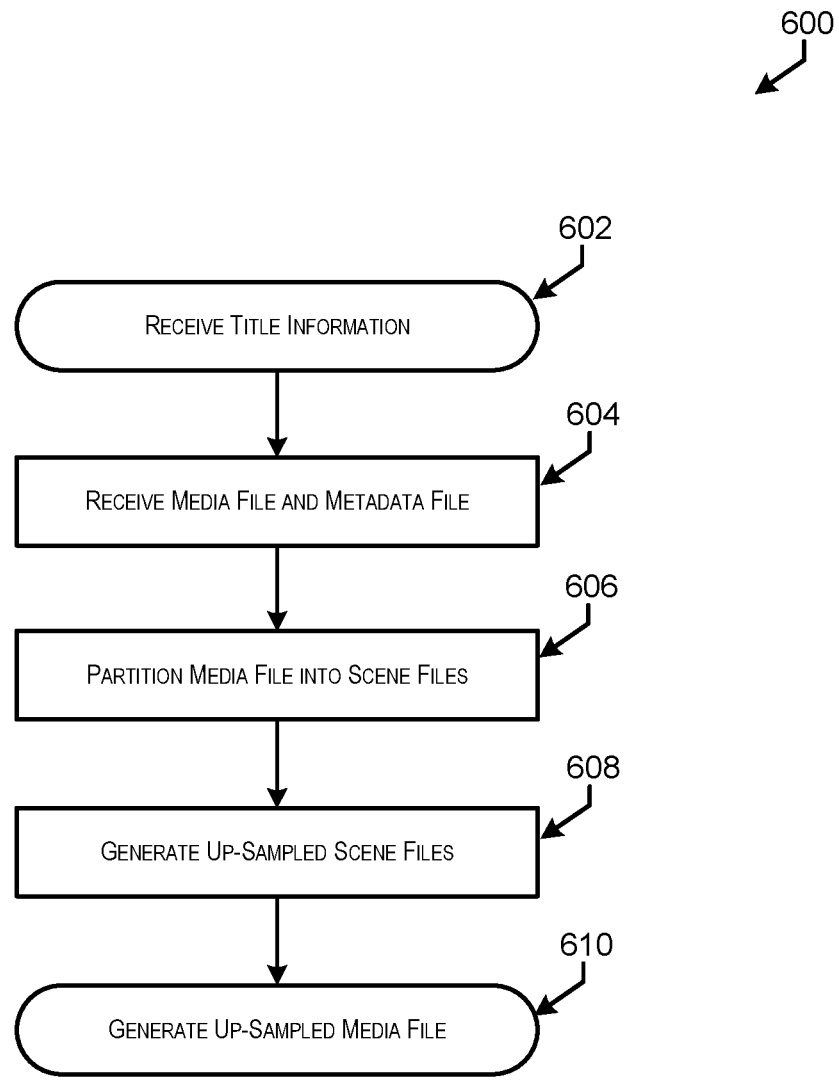
FIG. 6 is a flowchart illustrating an example of a process for up-sampling a media file according to certain embodiments.
Figure 7:
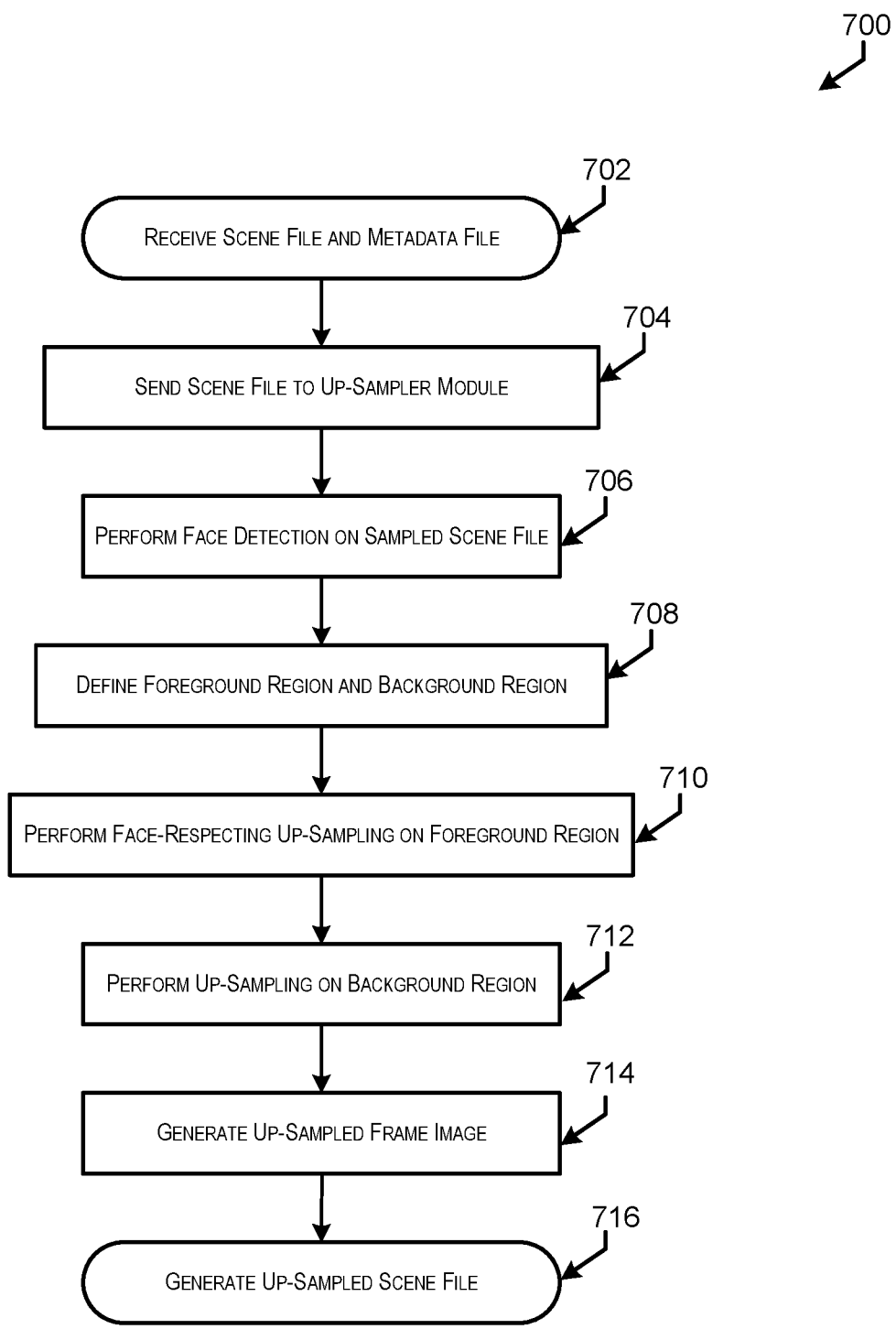
FIG. 7 is a flowchart illustrating an example of a process for up-sampling a scene file according to certain embodiments.

FIGS. 6 and 7 illustrate example flow charts for automated up-sampling features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs or one or more applications) executing collectively on one or more processors, by hardware or combinations thereof. AS noted above, the code may be stored on a computer-readable storage medium, for example, in the form of a computer program including a plurality of instructions executable by one or more processors. The computer-readable storage medium may be non-transitory.

FIG. 6 is a flowchart illustrating an example of a process 600 for up-sampling a media file according to certain embodiments. Process 600 may begin with operation 602 to receive a title of a media file, for example, by a computer system in communication with a database of media files, as discussed in reference to FIG. 2. In operation 604, the computer system may receive a media file associated with the title, and a metadata file associated with the title. The media file may be encoded at one or more pixel-resolution standards. The metadata file may be stored in a database of metadata files, while the media file may be stored in a database of media files (e.g. a cloud-based online media content library). The metadata file may include a plurality of image files, associated with characters appearing in the media file, as described in reference to FIGS. 1-5.

In operation 606 the computer system partitions the media file into scene files, such that each scene file corresponds to a scene in the media file. As discussed in reference to FIGS. 1-5, the computer system may generate an audio file and a video file from the media file, and further may segment the audio file into quiet and loud segments, smoothed according to a smoothing window according to the typical length of a scene transition in the media file. The computer system may partition the video file into scene files corresponding to the loud segments in the audio-file.

In operation 608, the computer system generates up-sampled scene files, as described in reference to FIGS. 1-5. As described in more detail in reference to FIG. 7, below, the up-sampling process may include region-specific up-sampling using conditioned spatio-temporal GANs trained to generate up-sampled reconstructed images. The computer system may implement operation 608 in parallel by distributing one or more scene files to a plurality of processors included in the computer system, as described in reference to FIG. 8. The operation 608 may include reconstructing scene files by weighted blending of foreground and background regions to generate an up-sampled scene file. For example, the foreground and background regions may be combined using weighted blending inversely proportional to the diction from the foreground region, such that the foreground and background regions blending minimizes up-sampling and continuity artifacts caused by separated up-sampling of facial regions and background regions.

In operation 610, the computer system generates an up-sampled media file, as described in reference to FIGS. 1 and 2. The computer system may combine the up-sampled scene files according to the sequence in which the corresponding scene files appear in the media file, such that the up-sampled media file presents the motion picture originally encoded in the media file.

FIG. 7 is a flowchart illustrating an example of a process 700 for up-sampling a scene file according to certain embodiments. Process 700 may begin with operation 702, the computer system receiving a scene file and an associated metadata file, as described in reference to FIG. 2. In operation 704, the computer system distributes scene files to one or more up-sampling modules, where the modules may be parallelized implementations of the algorithms described in reference to FIGS. 2-5, implemented in one or more processors of the computer system. In some embodiments, the operation 704 preserves the original sequence of scene files by generating a list of timestamps corresponding to the sequence position of each respective scene file in the original media file.

In operation 706, the computer system performs facial detection, recognition, and tracking on a sampled scene file as described in reference to FIG. 2. In some embodiments, the computer system detects facial features, matches the facial features to images included in the metadata file, and generates a tracking list of facial regions for use in conditioning the face-respecting up-sampling operation 710. In operation 708, the computer system defines a foreground and background region in a frame image from the scene file, were the computer system uses the facial regions detected and recognized in operation 706 to define the foreground region.

In operation 710, the computer system performs up-sampling on the foreground regions defined in operation 708 in a continuity window, as described in reference to FIGS. 2 and 5. In some embodiments, the computer system conditions a spatio-temporal GAN on facial features from the tracking list to perform up-sampling of the foreground regions. In some embodiments, the up-sampling is implemented using separate spatio-temporal GANs for the foreground region and the background region, as described in reference to FIG. 5. In operation 712, the computer system performs up-sampling on the background region, as described in reference to FIG. 5.

In operation 714, the computer system constructs an up-sampled frame image from the foreground and background regions, as described in reference to FIGS. 2 and 5. In some embodiments, the computer system generates the up-sampled frame image by weighted blending, such that the overall result of reconstructing the media file minimizes appearance of continuity and up-sampling artifacts.

In operation 716, the computer system generates an up-samples scene file by reconstructing a sequence of frame images present in the original scene file, as described in reference to FIGS. 2 and 4. In some embodiments, the computer system stores the up-sampled scene file pending completion of pending parallelized up-sampling processes, such that the generating an up-sampled media file operation (e.g. operation 610 of FIG. 6) occurs following the last of a plurality of instances of operation 714.

Figure 8:
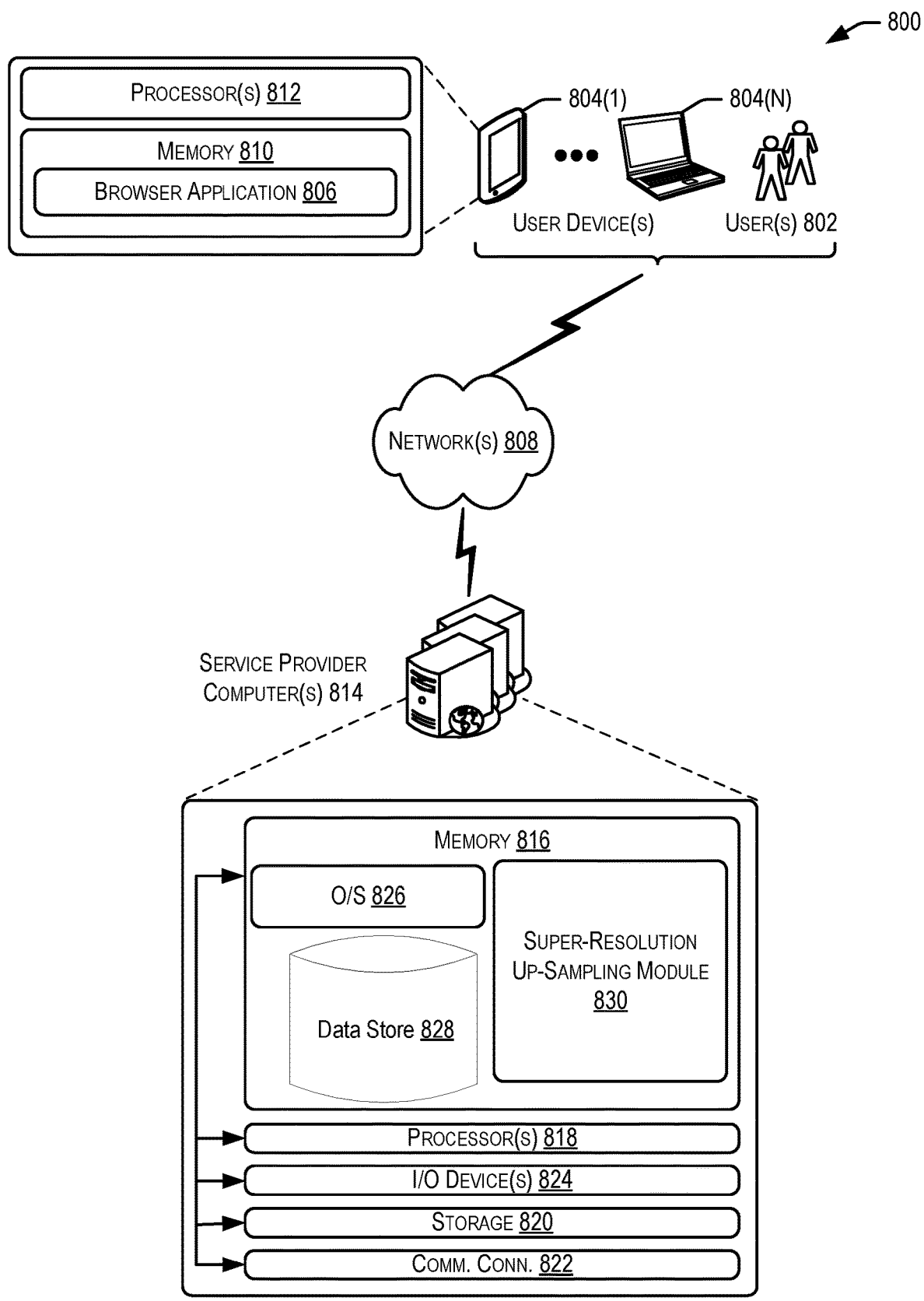
FIG. 8 is a diagram illustrating an example architecture for implementing an automated up-sampling feature, in accordance with at least one embodiment.

FIG. 8 is a diagram illustrating an example architecture 800 for implementing an automated up-sampling feature, in accordance with at least one embodiment. In architecture 800, one or more users 802 (e.g., customers, users, consumers, etc.) may utilize user computing devices 804(1)-(N) (collectively, user devices 804) to access a browser application 806 or a user interface (UI) accessible through the browser application 806, via one or more networks 808. The "browser application" 806 can be any browser control or native application that can access and display a network page or other information such as a user interface of a native software application for enabling the selection or interaction of content. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806.

The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the features disclosed herein. Additionally, the memory 810 may include one or more modules for implementing the features described herein including a super-resolution up-sampling module 830.

The architecture 800 may also include one or more service provider computers 814 that may, in some examples, provide computing resources such as, but not limited to, client entities, low latency data storage, durable data store, data access, management, virtualization, hosted computing environment or "cloud-based" solutions, electronic content performance management, etc. The service provider computers 814 may implement or be an example of the service provider computer(s) described herein with reference to FIGS. 1-6 and throughout the disclosure. The one or more service provider computers 814 may also be operable to provide site hosting, computer application development, and/or implementation platforms, combinations of the foregoing, or the like to the one or more users 802 via user devices 804.

In some examples, the networks 808 may include any one or a combination of many different types of networks, such as cable networks, the Internet, wireless networks, cellular networks, and other private and/or public networks. While the illustrated examples represents the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the super-resolution up-sampling module 830. In accordance with at least one embodiment, the super-resolution up-sampling module 830 may be configured to at least process media files to separate the media files into audio files and video files, segment the audio file into scene segments, partition the video file into scene files corresponding to the scene segments in the audio file, detect and recognize facial regions in the scene files, define foreground regions in sequenced frame images making up the scene files associated with recognized facial regions, define background regions containing frame image content not recognized in facial detection and recognition, up-sample foreground and background regions of frame images, generate up-sampled scene files, and generate up-sampled media files. In embodiments, the super-resolution up-sampling module 830 may be configured to automatically up-sample a media file identified based at least in part on data from a database of media files. Identifying based at least in part on data may include a determination that a media file stored in the database of media files is unavailable at one or more pixel-resolutions. The super-resolution up-sampling module 830 may be configured to generate up-sampled media files autonomously, selecting and processing media files independently or in communication with one or more automated systems. In accordance with at least one embodiment, the service provider computers 814 and super-resolution up-sampling module 830 may be configured to store up-sampled media files in data store 828 or, via networks 808, to distributed data storage systems (e.g. cloud storage systems).

Figure 9:
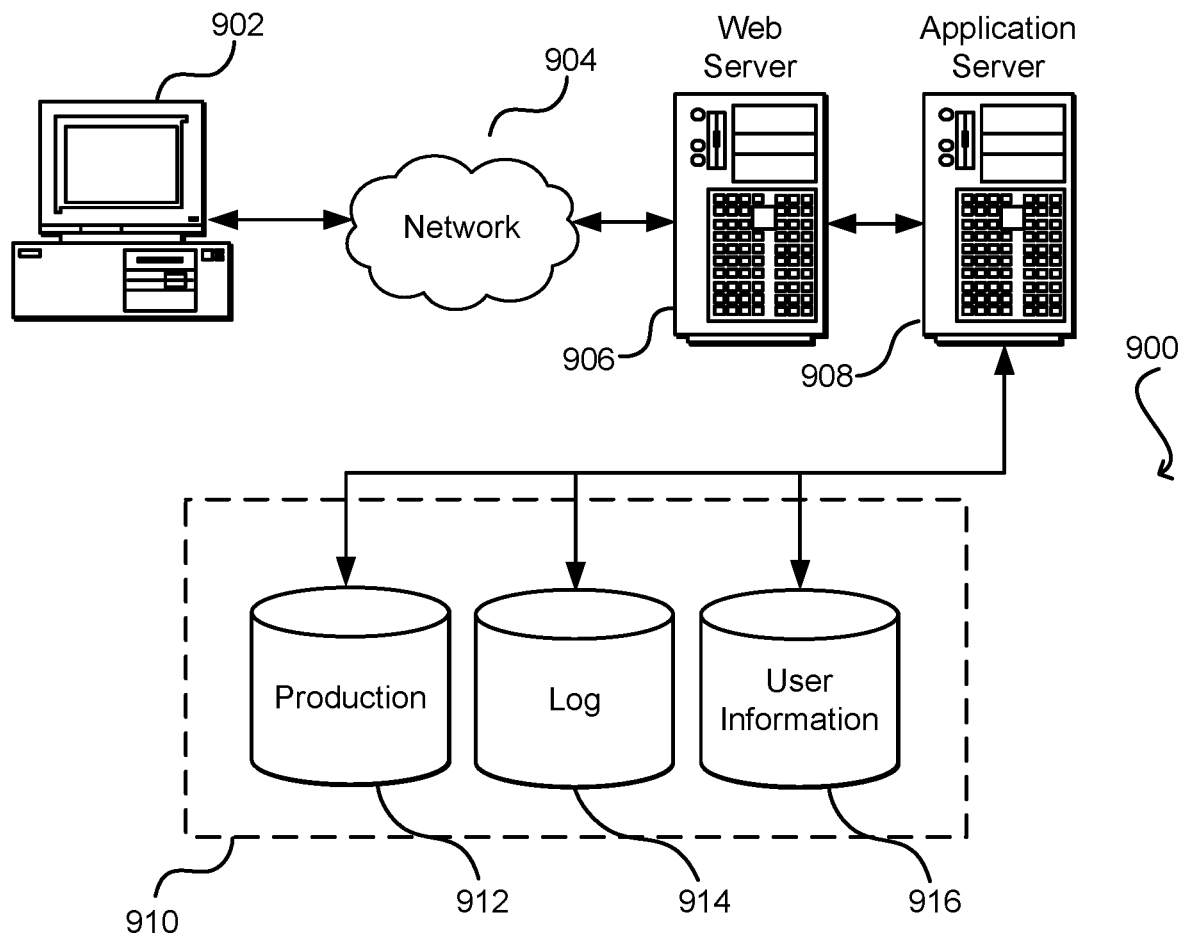
FIG. 9 is a diagram illustrating an environment in which various embodiments can be implemented.

FIG. 9 is a diagram illustrating aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable medium storing computer-executable instructions that, when executed by a processor of a computer system, cause the computer system to at least:
receive a title of a media file;
determine, based at least in part on the title, that an up-sampled media file is unavailable in a media database, the media database storing the media file;
receive a metadata file associated with the title from a metadata database different from the media database;
receive the media file from the media database;
partition the media file into one or more scene files, each scene file comprising a plurality of frame images in a sequence;
generate one or more up-sampled scene files, each corresponding to a scene file of the one or more scene files the one or more up-sampled scene files generated by:
identifying one or more sub-regions of a frame image of the plurality of frame images using the metadata file;
generating one or more up-sampled sub-regions at least in part by up-sampling the one or more sub-regions of the frame image using a first Generative Adversarial Network (GAN);
defining a background region, the background region comprising a portion of the frame image excluding the one or more sub-regions;
generating an up-sampled background region at least in part by up-sampling the background region of the frame image using a second GAN different from the first GAN; and
generating an up-sampled frame image at least in part by combining the up-sampled background region with the one or more up-sampled sub-regions; and
generate the up-sampled media file by combining at least a subset of the one or more up-sampled scene files.

2. The computer-readable medium of claim 1, wherein partitioning the media file into one or more scene files comprises:
generating an audio file and a video file from the media file;
determining one or more scene transitions in the audio file at least based at least in part on audio volume;
determining one or more scenes in the video file, each corresponding to a scene transition of the one or more scene transitions in the audio file; and
generating one or more scene files, each corresponding to a scene of the one or more scenes in the video file.

3. The non-transitory computer-readable medium of claim 1, wherein the metadata file comprises a plurality of metadata image files.

4. The non-transitory computer-readable medium of claim 3, wherein generating one or more up-sampled scene files further comprises identifying one or more characters in the frame image of the plurality of frame images, based at least in part on implementation of a facial recognition algorithm including deep learning features in a neural network and the plurality of metadata image files.

5. The non-transitory computer-readable medium of claim 4, wherein
the one or more sub-regions are contained within a foreground region identified at least in part by recognizing one or more faces in the frame image, the one or more faces corresponding to the one or more characters.

6. The non-transitory computer-readable medium of claim 1, wherein generating an up-sampled background region comprises:
up-sampling the background region at least in part by using the second GAN, the second GAN being trained at least in part using one or more pairs of images at different pixel-resolutions, the second GAN receiving a set of frame images in a continuity window corresponding to a first number of frame images preceding the frame image in the sequence and a second number of frame images following the frame image in the sequence, the second GAN minimizing transient pixel up-sampling artifacts in the continuity window at least in part by applying an attention layer to the continuity window.

7. The non-transitory computer-readable medium of claim 5, wherein generating one or more up-sampled sub-regions comprises generating an up-sampled foreground region using the foreground region at least in part by using the first GAN, the first GAN being trained at least in part using one or more pairs of images at different pixel-resolutions, the first GAN receiving a set of frame images in a continuity window corresponding to a first number of frame images preceding the frame image in the sequence and a second number of frame images following the frame image in the sequence, the first GAN minimizing pixel artifacts in the foreground region at least in part by applying an attention layer to the continuity window.

8. A system, comprising:
   a memory configured to store computer-executable instructions; and one or more processors in communication with the memory, and configured to execute the computer-executable instructions to at least:
   receive a title of a media file;
   determine, based at least in part on the title, that an up-sampled media file is unavailable in a media database, the media database storing the media file;
   receive a metadata file associated with the title from a metadata database different from the media database;
   receive the media file from the media database;
   partition the media file into one or more scene files, each scene file comprising a plurality of frame images in a sequence;
   generate one or more up-sampled scene files, each corresponding to a scene file of the one or more scene files the one or more up-sampled scene files generated by:
      identifying one or more sub-regions of a frame image of the plurality of frame images using the metadata file;
      generating one or more up-sampled sub-regions at least in part by up-sampling the one or more sub-regions of the frame image using a first Generative Adversarial Network (GAN);
      defining a background region, the background region comprising a portion of the frame image excluding the one or more sub-regions;
      generating an up-sampled background region at least in part by up-sampling the background region of the frame image using a second GAN different from the first GAN; and
      generating an up-sampled frame image at least in part by combining the up-sampled background region with the one or more up-sampled sub-regions; and
   generate the up-sampled media file by combining at least a subset of the one or more up-sampled scene files.

9. The system of claim 8, wherein partitioning the media file into one or more scene files comprises:
   generating an audio file and a video file from the media file;
   determining one or more scene transitions in the audio file at least in part by identifying one or more quiet segments and one or more loud segments; and
   generating one or more scene files at least in part by partitioning the video file according to the one or more scene transitions in the audio file.

10. The system of claim 8, wherein the metadata file comprises a plurality of metadata image files, such that the system processes the plurality of metadata image files to identify one or more characters in the one or more scene files.

11. The system of claim 10, wherein the system identifies one or more characters at least in part by implementing a facial recognition algorithm including deep learning features in a neural network, to recognize characters in the one or more scene files at least in part by matching a facial region detected in a scene file of the one or more scene files with one or more of the plurality of metadata image files.

12. The system of claim 11, wherein
   the one or more sub-regions are contained within a foreground region identified at least in part by recognizing one or more faces in the frame image the one or more faces corresponding to the one or more characters.

13. The system of claim 12, wherein generating one or more up-sampled scene files comprises:
   performing spatio-temporal up-sampling on the background region; and
   performing face-respecting spatio-temporal up-sampling on the foreground region;
   wherein face-respecting super-resolution up-sampling on the foreground region is based at least in part on using a generative adversarial network trained at least in part using one or more pairs of images at different pixel-resolutions, wherein the generative adversarial network receives a set of frame images in a continuity window corresponding to a first number of frame images preceding the frame image in the sequence and a second number of frame images following the frame image in the sequence, and wherein the generative adversarial network minimizes pixel artifacts in the foreground region at least in part by applying an attention layer to the continuity window.

14. The system of claim 13, wherein generating one or more up-sampled scene files further comprises implementing a discriminator model in the generative adversarial network, trained to minimize a loss function with respect to both the spatio-temporal up-sampling of the background region and the face-respecting spatio-temporal up-sampling of the foreground region.

15. The system of claim 13, wherein generating one or more up-sampled scene files further comprises generating an up-sampled frame image by at least:
   applying a first weighting factor to an up-sampled foreground region;
   applying a second weighting factor to an up-sampled background region; and
   combining up-sampled foreground region and the up-sampled background region.

16. The system of claim 8, wherein the first GAN is trained at least in part using one or more pairs of images at different pixel-resolutions.

17. The system of claim 8, wherein the first GAN minimizes pixel artifacts in the one or more up-sampled sub-regions at least in part by applying an attention layer to a continuity window, the continuity window corresponding to a first number of frame images preceding the frame image in the sequence and a second number of frame images following the frame image in the sequence.

* * * * *